Figure 1:
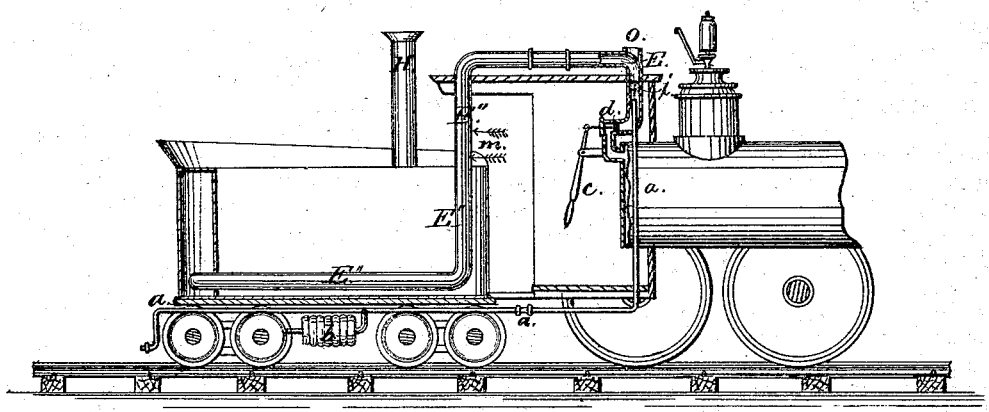
Figure 2:
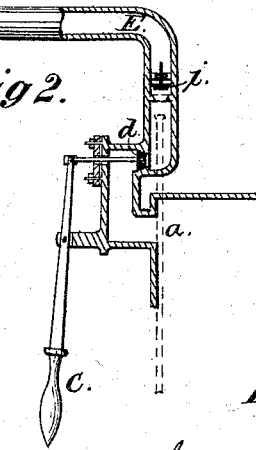

J. C. WIGHTMAN.
Vacuum Steam-Brakes.

No. 154,202. Patented Aug. 18, 1874.

Witnesses:
Wm. I. Goodrich
William Austin

Inventor:
Joseph C. Wightman

UNITED STATES PATENT OFFICE.

JOSEPH C. WIGHTMAN, OF BOSTON, ASSIGNOR TO WILLIAM I. GOODRICH, OF AUBURN DALE, MASSACHUSETTS.

IMPROVEMENT IN VACUUM STEAM-BRAKES.

Specification forming part of Letters Patent No. 154,202, dated August 18, 1874; application filed June 17, 1874.

*To all whom it may concern:*

Be it known that I, JOSEPH C. WIGHTMAN, of Boston, county of Suffolk, State of Massachusetts, have invented an Improvement in the Steam or Power Brake used on Locomotive-Engines and Cars, known as the "Vacuum-Brake," of which the following is a specification:

The object of this invention is to dispense with the noise produced by the escape of the steam used in forming the vacuum operating the brake, by conveying the steam and air exhausted from the brake-cylinders into a receptacle, in which not only will the vibration of the air be deadened, but the steam will be partially if not entirely condensed, and the air from the brake-cylinders escape noiselessly.

In its most effective form, my invention consists of conveying the steam used in producing the vacuum, with the air exhausted from the brake-cylinders, through a perfectly-tight tube or pipe of suitable size, under or through the water in the water-tank of the tender accompanying the locomotive; and the drawings are intended to illustrate my invention.

In order to more completely show my invention, I have shown, roughly, the details of the mechanism of the vacuum-brake to which my invention is to be applied.

$b$ is a flexible and contractible cylinder, operating the brake, and placed under each car. $a$ is a pipe connecting each cylinder, and, where the cars are shackled, consists of a flexible hose and coupling. E is a pipe connected with and opening a passage from the boiler to the air, and incloses the flaring end of the pipe $a$. This pipe E is at present carried out through the top of the cab a few inches. H is a pipe from the water-tank of the locomotive-tender. $d$ is a valve controlling the escape of steam, and $c$ is a lever operating the same. $i$ is a valve used to retain the vacuum in the braking-up apparatus.

The operation of the vacuum-brake is as follows: To brake up a train of cars the tube $a$, connected by flexible pipe and couplings between each car, runs the whole length of the train, and is connected by a pipe to the flexible and contractible cylinder $b$ under each car. The end of the pipe $a$, which terminates at the locomotive, is inclosed in the pipe E, connected with the boiler of the locomotive. The control of the flow of steam through the pipe E is by the valve $d$, operated by the lever $c$. The pipe E as now constructed ends at $o$, opening directly into the air above the locomotive-cab. Upon opening the steamway, by means of the lever $c$ and the valve $d$, the rapid passage of the steam from the boiler, by the end of the pipe $a$, causes the air to flow from the pipe $a$ and the cylinders $b$ connected to it, whereupon the pressure upon the heads of the cylinders $b$ causes them to close up or contract, exerting a pressure upon the braking-up device connected with the cylinders $b$.

The steam from the boiler and the air from the cylinders $b$ escape into the surrounding atmosphere at $o$, creating a great and alarming noise; and my invention consists in preventing this noise by the following means: Instead of allowing the pipe E to end at $o$, I continue the pipe E, as shown, with and into the tank of water carried on the locomotive-tender. The pipe E should be large and tight, and at the proper place—say, at $m$—should be connected with a sufficient length of flexible pipe and couplings to allow of ample movement between the locomotive and tender, without disconnecting the pipe unintentionally. This pipe E is continued to the bottom of the tank, and around it, as shown at the tank by the letter E''. This portion running horizontally at the bottom of the tank should be a perforated tube, to produce the best results. On the end of the tank opposite to that where the pipe E'' ends after passing around the tank there should be an opening and a raised pipe, H, and the top of this pipe H should be covered with a netting, to keep all extraneous substances from entering the water-tank. The steam and air, instead of passing directly into the atmosphere at $o$, will be conveyed, by the continuation of the pipe E E'', into the tank of the tender, where the steam will be condensed, saving its heat for the feed-water of the locomotive-boiler, and the vibrations of the escaping air from the brake-cylinders $a$ will be deadened. This air will escape comparatively noiselessly through the pipe H.

In place of extending the pipe E into the water-tank of the tender, it may be carried into a small tank, which may be carried on the tender or under the foot-board of the locomotive, containing water, into which the pipe E″ may be introduced, with proper outlet provided for the escaping air; but it will be obvious that the best and most practical receptacle is the water-tank of the tender before mentioned.

I claim—

In a vacuum air-brake, the steam-pipe E, and air-exhaust pipe $a$, in combination with the condenser-pipe E″ and the water-tank, the pipe being led under the water in said tank, substantially as and for the purpose herein described.

JOSEPH C. WIGHTMAN.

Witnesses:
 WM. I. GOODRICH,
 WILLIAM AUSTIN.